United States Patent
Callender et al.

(10) Patent No.: US 11,683,708 B2
(45) Date of Patent: Jun. 20, 2023

(54) DYNAMIC CHANGE OF MEASUREMENT GAPS

(71) Applicant: Telefonaktiebolaget LM Ericsson (publ), Stockholm (SE)

(72) Inventors: Christopher Callender, Kinross (GB); Icaro L. J. Da Silva, Solna (SE); Rui Fan, Beijing (CN); Muhammad Kazmi, Sundbyberg (SE); Helka-Liina Määttanen, Helsinki (FI); Iana Siomina, Täby (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 16/753,837

(22) PCT Filed: Oct. 8, 2018

(86) PCT No.: PCT/EP2018/077288
§ 371 (c)(1),
(2) Date: Apr. 6, 2020

(87) PCT Pub. No.: WO2019/068926
PCT Pub. Date: Apr. 11, 2019

(65) Prior Publication Data
US 2020/0288337 A1 Sep. 10, 2020

Related U.S. Application Data

(60) Provisional application No. 62/587,343, filed on Nov. 16, 2017.

(51) Int. Cl.
*H04W 24/10* (2009.01)
(52) U.S. Cl.
CPC .................................. *H04W 24/10* (2013.01)

(58) Field of Classification Search
None
See application file for complete search history.

(56) References Cited

U.S. PATENT DOCUMENTS

2013/0229971 A1\* 9/2013 Siomina .............. H04W 72/082
370/312
2018/0124687 A1\* 5/2018 Park ...................... H04L 5/1469
(Continued)

FOREIGN PATENT DOCUMENTS

WO  WO 2018/131895 A1   7/2018
WO  WO 2018/171730 A1   9/2018

OTHER PUBLICATIONS

3GPP TSG-RAN WG4 Meeting AH NR#3, R4-1709909, "Way Forward on UE measurement definition and capability", Nagoya, Japan, Sep. 18-21, 2017, 7 pages.
(Continued)

*Primary Examiner* — Jeffrey M Rutkowski
*Assistant Examiner* — Ning Li
(74) *Attorney, Agent, or Firm* — Sage Patent Group

(57) ABSTRACT

The invention refers to a method in a user equipment, UE, for a measurement gap pattern configuration including receiving a configuration information indicative of a measurement gap pattern configuration, and a bandwidth part, BW, configuration, determining an association between measurement gap patterns and BW parts, receiving a message to change the active BW part to one of the configured BW parts, and changing the measurement gap pattern as a function of the corresponding BW part and the association; the invention further refers to a corresponding method in a network node; to corresponding UE, a corresponding network node, and computer programs.

24 Claims, 6 Drawing Sheets

(56) References Cited

U.S. PATENT DOCUMENTS

| | | | | |
|---|---|---|---|---|
| 2018/0132061 A1* | 5/2018 | Bitra | ..................... | H04W 4/023 |
| 2018/0343132 A1* | 11/2018 | Maheshwari | ........... | H04L 12/16 |
| 2019/0021017 A1* | 1/2019 | Nagaraja | ............. | H04W 72/042 |
| 2019/0044689 A1* | 2/2019 | Yiu | ..................... | H04W 72/042 |
| 2019/0132862 A1* | 5/2019 | Jeon | ..................... | H04L 5/0064 |
| 2019/0363809 A1* | 11/2019 | Yoon | ..................... | H04W 56/00 |
| 2020/0014523 A1* | 1/2020 | Huang | .................... | H04L 5/001 |
| 2020/0022040 A1* | 1/2020 | Chen | ................ | H04W 36/0085 |
| 2020/0059345 A1* | 2/2020 | Pelletier | ................ | H04L 1/1657 |
| 2020/0084652 A1* | 3/2020 | Xue | ..................... | H04W 24/10 |
| 2020/0100132 A1* | 3/2020 | Liu | ..................... | H04W 24/10 |
| 2020/0136878 A1* | 4/2020 | Yi | ..................... | H04W 72/0453 |
| 2020/0162957 A1* | 5/2020 | Zhang | .................. | H04W 24/10 |
| 2020/0169340 A1* | 5/2020 | Hwang | ................. | H04W 48/16 |
| 2021/0092008 A1* | 3/2021 | Yi | ........................ | H04L 5/0005 |
| 2021/0167930 A1* | 6/2021 | Jeon | ..................... | H04W 76/28 |

OTHER PUBLICATIONS

3GPP TS 38.133 v0.2.0 (Sep. 2017), $3^{rd}$ Generation Partnership Project; Technical Specification Group Radio Access Network; New Radio(NR); Requirements for support of radio resource management (Release 15), 15 pages.

3GPP TS 38.331 v0.1.0 (Oct. 2017), $3^{rd}$ Generation Partnership Project; Technical Specification Group Radio Access Network; NR; Radio Resource Control (RRC); Protocol specification (Release 15), 42 pages.

3GPP TS 36.300 v14.4.0 (Sep. 2017), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 329 pages.

International Search Report and Written Opinion of the International Searching Authority, PCT/EP2018/077288, dated Dec. 6, 2018, 13 pages.

Mediatek Inc., 3GPP TSG-RAN WG2 #99-bis, R2-1710864, "Basic Framework for Bandwidth Part Operation,"Prague, Oct. 9-13, 2017.

AT&T, 3GPP TSG RAN WG1 Meeting #90, R1-1712696, "SS block transmissions in a wideband CC," Prague, P.R. Czechia Aug. 21-25, 2017.

LG Electronics, 3GPP TSG RAN WG1 Meeting NR#3, R1-1715892, "Discussion on carrier aggregation and bandwidth parts," Nagoya, Japan, Sep. 18-21, 2017.

Samsung, 3GPP TSG RAN WG2 #99bis, R2-1711607, "Scenarios of Measurement Gap Considering Bandwidth Part," Prague, Czech Republic, Oct. 9-13, 2017.

Ericsson, 3GPP TSG-RAN WG2 #100, R2-1713737 (update of R2-1709294), "Configuration of measurement gap in NR," Reno, USA, Nov. 27-Dec. 1, 2017.

* cited by examiner

| *MeasGapSharingConfig* field descriptions |
|---|
| *measGapSharingScheme* Indicates the measurement gaps sharing scheme for BL UEs in CE mode A and CE mode B, see TS 36.133 [16, Table 8.13.2.1.1.1-2 and Table 8.13.3.1.1.1-3]. Value *scheme00* corresponds to "00", value *scheme01* corresponds to "01", and so on. |

Fig. 9

8.13.2.1   E-UTRAN intra frequency measurements by UE category M1 with CE mode A Table 8.13.2.1.1.1-1: Requirement on cell identification delay and measurement delay for FDD intrafrequency cell

| Gap pattern ID | Cell identification delay ($T_{identify\_intra\_UE\_cat\_M1}$) | Measurement delay ($T_{measure\_intra\_UE\_cat\_M1}$) |
|---|---|---|
| 0 | $1.44 * K_{intra\_M1\_NC}$ seconds | $480 * K_{intra\_M1\_NC}$ ms |
| 1 | $2.88 * K_{intra\_M1\_NC}$ seconds | $960 * K_{intra\_M1\_NC}$ ms |

$K_{intra\_M1\_NC} = 1 / X * 100$ where X is a signalled RRC parameter TBD [2] and is defined as in Table 8.13.2.1.1.1-2.

Table 8.13.2.1.1.1-2: Value of parameter X for CEModeA

| Network signaling ParameterName (to be determined by RAN2) | Value of X (%) |
|---|---|
| '00' | [Equal split] |
| '01' | [40] |
| '10' | [50] |
| '11' | [60] |

Fig. 10

8.13.2.6   E-UTRAN inter frequency measurements by UE category M1 with CE mode A Table 8.13.2.6.1.1-1: Requirement on cell identification delay and measurement delay for FDD interfrequency cell

| Gap pattern ID | Cell identification delay ($T_{identify\_inter\_UE\_cat\_M1\_NC}$) | Measurement delay ($T_{measure\_inter\_UE\_cat\_M1\_NC}$) |
|---|---|---|
| 0 | $1.44 * K_{inter\_M1}$ seconds | $480 * K_{inter\_M1}$ ms |
| 1 | $2.88 * K_{inter\_M1}$ seconds | $960 * K_{inter\_M1}$ ms |

$$K_{inter\_M1} = \frac{N_{freq} * 100}{(100 - X)}$$

where X is signalled by the RRC parameter TBD [2] and is defined as in Table 8.13.2.6.1.1-2.

Table 8.13.2.6.1.1-2: Value of parameter X for CEModeA

| Network signaling ParameterName (to be determined by RAN2) | Value of X (%) |
|---|---|
| '00' | [Equal split] |
| '01' | [40] |
| '10' | [50] |
| '11' | [60] |

Fig. 11

DYNAMIC CHANGE OF MEASUREMENT GAPS

CROSS REFERENCE TO RELATED APPLICATIONS

This application is a 35 U.S.C. § 371 national stage application of PCT International Application No. PCT/EP2018/077288 filed on Oct. 8, 2018, which in turns claims domestic priority to U.S. Provisional Patent Application No. 62/587,343, filed on Nov. 16, 2017, and claims foreign priority to PCT International Application No. PCT/CN2017/105402, filed on Oct. 6, 2017, the disclosures and content of which are incorporated by reference herein in their entirety.

TECHNICAL FIELD

The present disclosure generally relates to the field of telecommunication technology, and in particular, to measurement gap handling with respect a radio interface between a User Equipment (UE) and an access network node (also being referred to as new radio NodeB, gNB).

BACKGROUND

Before a handover, a UE will typically measure its received cell power (or signal quality) of a target cell and report it to its serving network, so that the network can make a decision whether to allow the UE to handover to the target cell or not.

In 3GPP new radio (NR) specifications, measurement gaps are provided to allow UEs to perform radio frequency (RF) retuning to perform measurements on signals such as synchronization burst (or synchronization block), SSB, (that may be regarded as time windows for providing synchronization information) which are not within the receive bandwidth of the UE.

Measurement gaps are time periods wherein the UE switches off its receiver (and transmitter) from the current serving cell so that no data transmission and reception between the UE and the current serving cell will occur. During a measurement gap, the UE may thus switch (or tune) to the target cell temporarily, perform a signal quality measurement, and return to the current serving cell. The gap periods have to be in synchronization with the gNB because the gNB should know when the UE will enter the gap state. Such synchronization may be achieved by signaling between the UE and the network.

Thus, performing a gap measurement may comprise switching off a receiver (and a transmitter) from the current active cell, tuning the receiver (and transmitter) to another cell, performing a signal quality measurement, and after the measurement gap retuning the receiver (and transmitter) to the current active cell.

According to 3GPP TS 36.300 (current version 14.4.0), which is incorporated herein by reference in its entirety, there is the following definition:

Intra-frequency neighbour (cell) measurements: Neighbour cell measurements performed by the UE are intra-frequency measurements when the current and target cell operates on the same carrier frequency.

Inter-frequency neighbour (cell) measurements: Neighbour cell measurements performed by the UE are inter-frequency measurements when the neighbour cell operates on a different carrier frequency, compared to the current cell.

Further, TS 36.300 states that whether a measurement is none-gap assisted or gap assisted depends on the UE's capability and the current operating frequency. In none-gap assisted scenarios, the UE shall be able to carry out such measurements without measurement gaps. In gap assisted scenarios, the UE should not be assumed to be able to carry out such measurements without measurement gaps. The UE determines whether a particular cell measurement needs to be performed in a transmission/reception gap and the scheduler needs to know whether gaps are needed.

FIG. 1 shows some Inter and Intra-frequency measurement scenarios:

Same carrier frequency and cell bandwidths (Scenario A): an intra-frequency scenario; not measurement gap assisted.

Same carrier frequency, bandwidth of the target cell smaller than the bandwidth of the current cell (Scenario B): an intra-frequency scenario; not measurement gap assisted.

Same carrier frequency, bandwidth of the target cell larger than the bandwidth of the current cell (Scenario C): an intra-frequency scenario; not measurement gap assisted.

Different carrier frequencies, bandwidth of the target cell smaller than the bandwidth of the current cell and bandwidth of the target cell within bandwidth of the current cell (Scenario D): an inter-frequency scenario; measurement gap-assisted scenario.

Different carrier frequencies, bandwidth of the target cell larger than the bandwidth of the current cell and bandwidth of the current cell within bandwidth of the target cell (Scenario E): an inter-frequency scenario; measurement gap-assisted scenario.

Different carrier frequencies and non-overlapping bandwidth, (Scenario F): an inter-frequency scenario; measurement gap-assisted scenario.

Same carrier frequency, the operating frequency of the bandwidth reduced low complexity (BL) UE or the UE in Enhanced Coverage is not guaranteed to be aligned with the center frequency of the current cell (Scenario G): an intra-frequency scenario; measurement gap assisted scenario.

Thus, differently, to inter-frequency measurements, according to TS 36. 300, intra-frequency measurements may be performed without providing measurement gaps, if the UE operating channel bandwidth (CBW) can cover both serving cell SSB.

However, there may be certain conditions wherein measurement gaps may be necessary even in intra-frequency measurement conditions, e.g. if the subcarrier spacing of the SSB of the serving and neighbour cell are different, and/or UE operation CBW cannot cover serving cell SSB and target cell SSB. In the table below, which is taken from 3GPP TSG-RAN WG4 document R4-1709909:

| Categories | Conditions |
| --- | --- |
| Intra-frequency measurement without measurement gap | the center frequency of the SSB of the serving cell and the center frequency of the SSB of the neighbour are the same, and the subcarrier spacing of the SSB of the serving and neighbor cell are the same, and UE operation CBW can cover both serving cell SSB and target cell SSB, and |

-continued

| Categories | Conditions |
| --- | --- |
| Intra-frequency measurement with measurement gap | the center frequency of the SSB of the serving cell and the center frequency of the SSB of the neighbour are the same, and the subcarrier spacing of the SSB of the serving and neighbor cell are different, and/or<br>UE operation CBW cannot cover serving cell SSB and target cell SSB (the UE CBW in this case might vary among different OFDM symbols), and/or |

In NR, there is a concept of bandwidth parts, which can be used to configure the UE operating channel bandwidth on a semi-static or dynamic basis. A bandwidth (BW) part covers a subset of the gNB channel bandwidth; the concept of bandwidth part operation is to configure a UE to operate one or a plurality of such bandwidth parts. Such bandwidth parts may be configured by Radio Resource Control, RRC, signaling; optionally, the UE active bandwidth part may be switched between different configured bandwidth parts (assuming multiple BW parts are configured) using fast layer 1 signaling, e.g. downlink control information, DCI, signaling, allowing the active bandwidth part to be selected dynamically out of the set of configured bandwidth parts.

Further, a default bandwidth part may be provided, so that in an event that the UE and gNB get misaligned over the current active bandwidth part (for example, the gNB sends DCI to the UE to change active BW part but the UE does not receive the DCI), the UE will return to the default BW part so that scheduling can be resumed.

In summary, from the above description of intra-frequency measurements with and without gaps, it may be seen that a need for intra-frequency measurement gaps depends on whether the UE operating channel bandwidth can cover both serving cell SSB and target cell SSB. However, the UE operating channel bandwidth may be changed dynamically (e.g. using fast DCI signaling). Consequently, the need for measurement gaps may also change dynamically.

If measurement gaps are configured by means of RRC signaling, starting or stopping measurement gaps requires sending corresponding RRC messages. The gNB may need to send RRC message to stop or start gaps, if the active BW part in the UE is changed such that a need for gaps changes. As discussed, such change may be controlled by layer 1 signalling (DCI signalling).

The start/stop signaling may however create a high signaling. Further, such mechanism may lead to a signaling layer mixture (layer 1 for BW part changing, and RRC signaling for gap changing).

One solution might be to apply RRC signaling both to change gaps, and to reconfigure the active BW part. However, that would mean to renounce/to abstain from fast BW part reconfiguration.

SUMMARY

It is an object of the present invention to improve the change of measurement gaps.

According to a first aspect of the present disclosure, a method to change measurement gaps in user equipment (UE) is proposed. The method comprises:
receiving a configuration information indicative of a measurement gap pattern configuration, and a bandwidth, BW, part configuration,
determining an association (or mapping) between measurement gap patterns and BW parts of said configurations,
receiving a message to change the active BW part to one of the configured BW parts, and
changing the measurement gap pattern as a function of the BW part and the association (mapping).

According to a further aspect, a method in a network element, e.g. gNB, to change the measurement gaps comprises:
transmitting a configuration information indicative of a measurement gap pattern configuration, and a bandwidth, BW, part configuration,
determining an association between measurement gap patterns and BW parts of said configurations,
performing a communication with the UE according to the gap pattern associated with the new active BW part in the UE.

A further aspect concerns a user equipment, UE, comprising a processor; and a memory storing instructions which, when executed by the processor, cause the processor to perform the steps of:
receiving a configuration information indicative of a measurement gap pattern configuration, and a bandwidth, BW, part configuration,
determining an association between measurement gap patterns and BW parts of said configurations, and
receiving a message to change the active BW part to one of the configured BW parts, and
changing the measurement gap pattern as a function of the BW part and the association.

A further aspect concerns a network element, e.g. a gNB, comprising a processor and a memory storing instructions which, when executed by the processor, cause the processor to perform the steps of:
transmitting a configuration information indicative of a measurement gap pattern configuration, and a bandwidth, BW, part configuration,
determining an association between measurement gap patterns and BW parts of said configurations,
performing a communication with the UE according to the gap pattern associated with the new active BW part in the UE.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 9 is a diagram showing a table which illustrates MeasGapSharingConfig field descriptions according to an embodiment of the present disclosure.

FIG. 10 is a diagram showing a table which illustrates E-UTRAN intra frequency measurements by UE category M1 with CE mode A according to an embodiment of the present disclosure.

FIG. 11 is a diagram showing a table which illustrates E-UTRAN inter frequency measurements by UE category M1 with CE mode A according to an embodiment of the present disclosure.

DETAILED DESCRIPTION

Figure 1:
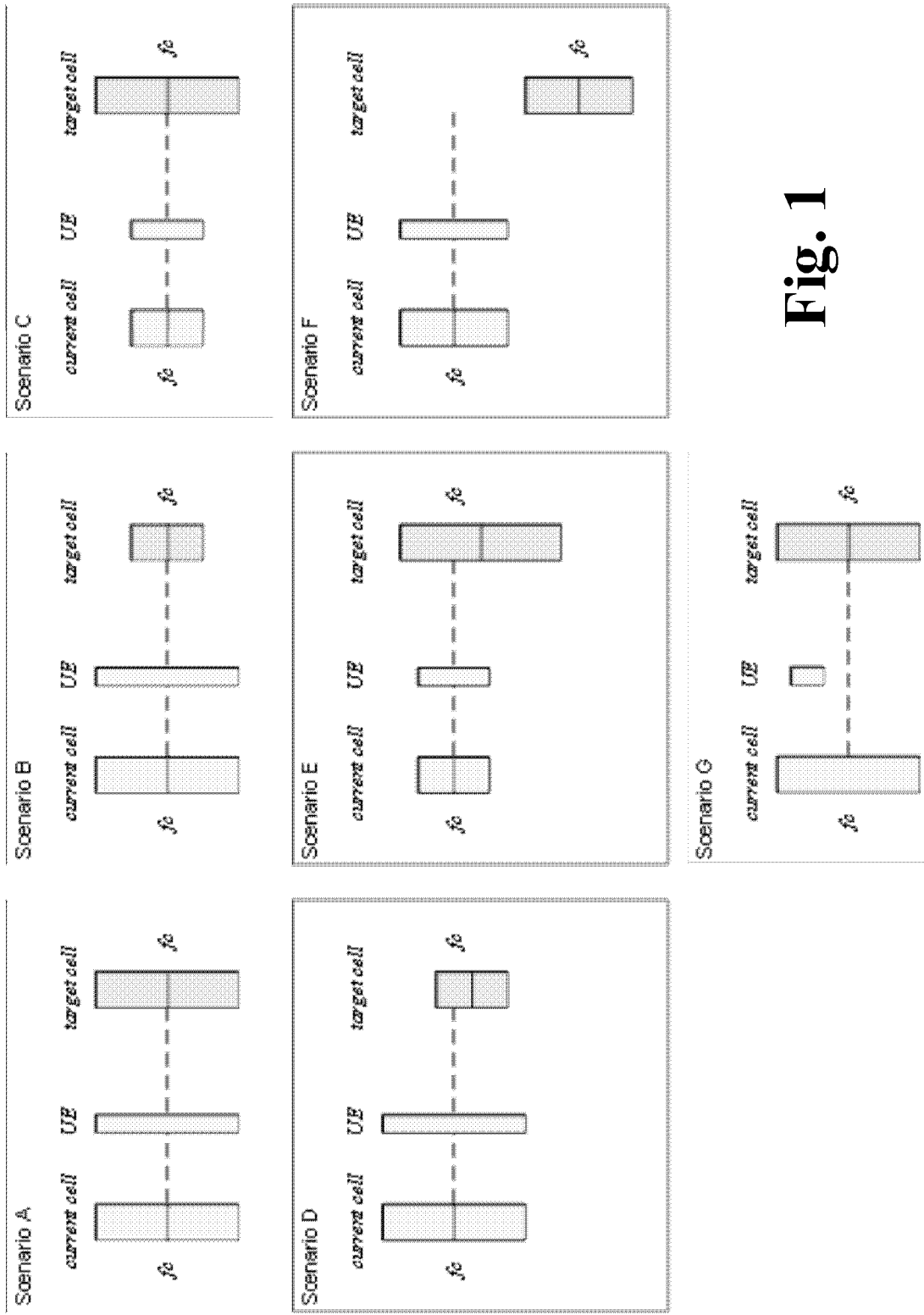
FIG. 1 shows some Inter and Intra-frequency measurements scenarios according to the related art.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

In some embodiments of the present disclosure, a general workflow may be summarized as follows. First, a UE may report its capability information comprising, but not limited to, whether the UE supports multi-directional reception, whether the UE supports measurement using multiple numerologies concurrently, and/or whether the UE supports a frequency shift in the digital domain prior to measuring, to its serving cell, for example, a gNB in a 5G NR case. Upon receiving such UE capability information or at a later stage, the gNB may determine whether a measurement gap shall be configured or scheduled for the UE based on the UE capability information and/or other factors, such as, a numerology used by a neighboring cell to be measured by the UE, current load of the neighboring cell. After that, the gNB may notify the UE of whether a measurement gap is configured for the UE or not, and the UE may act upon such an indication and measure reference signals from the neighboring cell with or without the measurement gap.

In an embodiment, as well as providing a configuration of multiple BW parts to the UE, the gNB may provide a configuration of multiple (measurement) gap patterns which are associated with BW part configurations. Both configurations may be provided by means of RRC signaling between UE and gNB.

The gap patterns may comprise a "none-gap" pattern, such that one or a plurality of the multiple BW parts can be associated with no gap (no measurement gaps are needed to perform SSB measurements). A gap pattern may be characterized by at least one of: a (repetition) periodicity, a gap length (in each period), and a gap offset, wherein the "none-gap" pattern may be regarded as a gap pattern with zero length, zero periodicity and/or zero offset.

When the UE changes the active BW part (for example in response to DCI signaling from gNB), it autonomously changes its measurement gap pattern according to the association; i.e. without receiving any signaling gap pattern change from the gNB.

The association may be explicitly provided to the UE together with the gap pattern configuration. Alternatively, the UE may perform the association according to certain rules, wherein the certain rules are known by the gNB. The rules may be pre-configured in the UE or may be received from the network.

In an example, the UE may be configured to operate with two BW part configurations, wherein a first BW part has a broad frequency range and a second BW part has narrow frequency range. The range of the SSB to be measured may fall within the broad frequency range of the first BW part, but it may be partly or entirely out of the range narrow frequency range of the second BW part. If the UE changes the active BW part (for example in response to DCI signaling) from the first BW part to the second BW part and vice versa, it changes from a first certain measurement gap (in this case the none-gap pattern) to a second certain measurement gap (characterized by a certain length, periodicity and offset) and vice versa.

At the same time, when the network scheduler changes its assumption of UE active BW part (for example due to the DCI signaling) it changes its assumption on the measurement gap pattern the UE will be using.

In other words, gap patterns are preconfigured, and the gNB may update the knowledge of the gap pattern currently used by the UE whenever the active BW part in the UE changes.

Once the pre-configuration is performed, the measurement gap pattern switching may be done implicitly whenever the active BW part changes (which is known to both network and UE) requiring no further signaling (beyond the signaling which changes active BW part) to switch gaps on or off, or to change the gap parameters (e.g. density) when active BW part changes take place.

In the following, an exemplary embodiment will be described in more detail:

Step 1:

The UE is configured with a plurality of measurement gap configurations.

In an embodiment, at least one of these measurement gap configurations may allow intra-frequency measurement to be performed in gaps, and at least one of these configurations may allow intra-frequency measurement to be performed without gaps (this may be a "none-gap" configuration, if gaps are not needed by the UE for other purposes such as inter-frequency measurements).

Step 2:

The UE is configured with a plurality of BW part configurations.

Step 3:

The UE is configured with an association (or mapping or binding) between each BW part configuration and a corresponding gap configuration.

The network node may explicitly control the association (or binding or mapping) between BW part and measurement configuration.

The association configuration may be signaled by the network (e.g. via RRC).

Alternatively, the UE may autonomously perform the configuration, e.g. by means of certain configuration rules (preconfigured or signaled). Thereto, the network node may configure a rule or a parameter to be used by the UE to establish the association between the BW part and measurement configuration. Alternatively, the association and/or rule(s) may be preconfigured in the UE/gNB.

Specifically, an association (or mapping or binding) between a "none-gap" configuration and a certain BW part configuration may be explicitly signaled; alternatively, it may be implied in both UE and network by a BW part configuration which contains the intra-frequency SS block.

Step 4:

When the active BW part in use changes (for example, in response to a received layer 1 signaling, or when the UE returns to a default BW part) the UE autonomously changes the measurement gap configuration to the associated gap pattern (as performed in step 3).

Step 5:

When the network changes the active BW part in use by a UE (for example by a layer 1 signaling, or when it assumes that the UE has returned to the default BW part), the data scheduling in the gNB is performed under the knowledge or assumption that the UE is using the measurement gap configuration which is the one associated (mapped) with the new active BW part.

Steps 1-3 may be regarded as configuration steps, and steps 4-5 may be regarded as operating steps.

It is to be noted that above-described step may be performed in different order; e.g. steps 1 and step 2 may be performed in reverse order.

Activation/de-activation of the configured BW parts may be controlled by means of layer 1 signalling, e.g. by DCI signaling.

If a BW part is selected by the network (e.g. depending on how much traffic it expects is coming for that UE), embodiments allow the UE to determine the association (mapping) between BW parts and measurement gap patterns suitable for measurement operations when said BW part configuration is taken into use. As a result, the UE uses a measurement gap pattern that is suitable to be used for measurements associated to the selected BW part.

Thus, according to embodiments, upon performing a switching of active BWP, the UE also switches the active measurement configuration or certain parameter values in the measurement configuration by checking the mapping (or the association) from measurement configuration to BWP.

In an embodiment, the UE is configured by the network with:
- a list of one or more BWP configurations;
- a list of one of more measurement configuration(s);
- a binding mechanism (or association or mapping) between the BWP configuration(s) and the measurement configuration(s) so that the UE can know that a change in BWP configuration (e.g. a BWP activation) leads to a change in the measurement configuration.

In an embodiment, at least one of these measurement gap configurations may allow intra-frequency measurement to be performed in gaps, and at least one of these configurations may allow intra-frequency measurement to be performed without gaps (this may be a "none-gap" configuration, if gaps are not needed by the UE for other purposes such as inter-frequency measurements).

Therewith, in an embodiment, when the BW part switch takes place, the measurement may change from being gap based to gapless (none-gap pattern) or vice versa.

In an embodiment, based on the determined measurement configuration to be used by the UE, the network node may perform one of:
- adaptively configure one or more of its timers or counters associated with the determined measurement configuration;
- send the determined measurement configuration to another node;
- adaptively configure one or more of its operations, e.g., retransmission of signal or channel to the UE, adapt the transmission configuration (e.g., time and/or frequency resources, bandwidth, periodicity, transmit power) of at least one signal or channel;
- send a new measurement configuration to be associated with a BWP based on the association; and
- determine and send one or more of BWPs and one or more of measurement configurations associated with the BWPs.

Above-described embodiments may be extended to include any other RRC signaling which is associated with measurement gaps. For example, it may be proposed to introduce signaling for gap sharing schemes between intra and inter-frequency measurements.

In 3GPP LTE specifications (e.g. TS 36.331, current version 14.4), a field or parameter for a configuration of a measurement gap sharing, MeasGapSharingConfig, is specified (for bandwidth reduced low complexity, BL, UEs) to allow controlling a sharing scheme between intra and inter-frequency measurements:

MeasGapSharingConfig Information Element

| MeasGapSharingConfig information element |
|---|
| -- ASN1START<br>MeasGapSharingConfig-r14 ::=    CHOICE {<br>    release    NULL,<br>    setup    SEQUENCE {<br>        measGapSharingScheme-r14    ENUMERATED {scheme00, scheme01, scheme10, scheme11}<br>    }<br>}<br>-- ASN1STOP |
| MeasGapSharingConfig field descriptions<br>measGapSharingScheme<br>Indicates the measurement gaps sharing scheme for BL UEs in CE mode A and CE mode B, see TS 36.133 [16, Table 8.13.2.1.1.1-2 and Table 8.13.3.1.1.1-3]. Value scheme00 corresponds to "00", value scheme01 corresponds to "01", and so on. |

FIG. 9 is a diagram showing a table which illustrates MeasGapSharingConfig field descriptions.

This may be used for both intra-frequency and inter-frequency measurements, as shown in FIG. 10 and FIG. 11.

FIG. 10 is a diagram showing a table which illustrates E-UTRAN intra frequency measurements by UE category M1 with CE mode A.

FIG. 11 is a diagram showing a table which illustrates E-UTRAN inter frequency measurements by UE category M1 with CE mode A.

"Equal split" means that gaps are shared equally for each frequency layer including the intra layer. Otherwise the gaps are first split according to the configured splitting between intra frequency measurements with X % of the gaps assumed for intra-frequency requirements and (100-X) % of the gaps assumed for inter-frequency requirements, wherein X may be any real number between 0 and 100.

In the following, an embodiment will be described using measurement gap sharing configuration, similar the above-discussed embodiment of measurement gap pattern configuration.

Step 11:

The UE is configured with multiple (measurement) gap sharing configurations (MeasGapSharingConfig).

Step 12:

The UE is configured with multiple BW part configurations, such that the active BW part may be controlled by layer 1 signaling (e.g. by means of DCI signalling).

Step 13:

The UE is configured with an association between each BW part configuration and a corresponding gap sharing configuration (MeasGapSharingConfig).

Step 14:

When the active BW part in the UE changes (for example, in response to a received layer 1 signaling, or when returning to a default BW part) the UE autonomously changes the gap sharing configuration (MeasGapSharingConfig) to the one associated with the new active BW part (of step 13).

Step 15:

When the network changes the active BW part in use by a UE (for example by layer 1 signaling (e.g. sending a corresponding DCI), or when it assumes that the UE has returned to the default BW part), the gNB knows/assumes that the UE is using the gap sharing configuration (MeasGapSharingConfig) which is associated with the new active BW part.

In embodiments, any other RRC parameters that are indicative of any of the configurations described above may be used.

Please note that although the embodiments below are described in the context of 5G NR, the present disclosure is not limited thereto. The embodiments herein are applicable to any appropriate telecommunication technology, for example, WCDMA, LTE, LTE-A, etc. Further, the term "UE" used herein may refer to, but not limited to, a mobile phone, a smart phone, a tablet, a user terminal, a mobile device, a mobile terminal, a user terminal, a user device, a WTRU (wireless transmit/receive unit), a desktop, a laptop, a PDA (Personal Digital Assistant), a media player, a game console, or any electronic device which can implement same or similar functions. Further, please note that the term "network element" used herein may refer to, but not limited to, a base station, a NodeB, an eNodeB, a gNB, an access point, a transmission point, a MME, or any device which can implement same or similar functions. Furthermore, any function described in some embodiments as being implemented by a single entity can be, in some other embodiments, implemented by multiple entities and vice versa.

Figure 2:
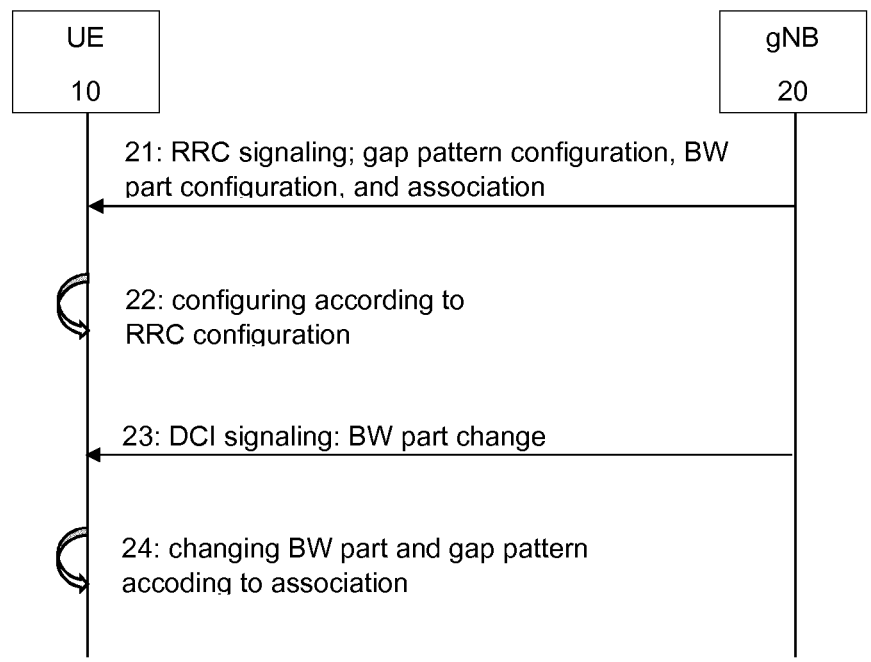
FIG. 2 is a diagram showing an exemplary message flow between a UE and a gNB (next generation NodeB) for measurement gap pattern configuration and BW part configuration according to an embodiment of the present disclosure.

FIG. 2 is a diagram showing an exemplary message flow between a UE 10 and a network element (e.g. gNB) 20 for a measurement gap pattern configuration according to an embodiment of the present disclosure.

As shown in FIG. 2, in step 21 the gNB may transmit, e.g. by means of RRC messages, a measurement gap pattern configuration a BW part configuration, and an association between gap patterns and BW parts of said configurations.

In a step 22, the UE gets configured according the configuration messages received from the gNB 20.

In a step 23, the gNB sends a message, e.g. a DCI message, to the UE to change the BW part to one of the configured BW parts (to de-activate the current active BW part and to activate the BW part indicated in the message).

In a step 24, the UE changes the BW part according to the received (DCI-)message. The UE 20 further changes the gap pattern as a function of the BW part and the association without any further signaling.

Figure 3:
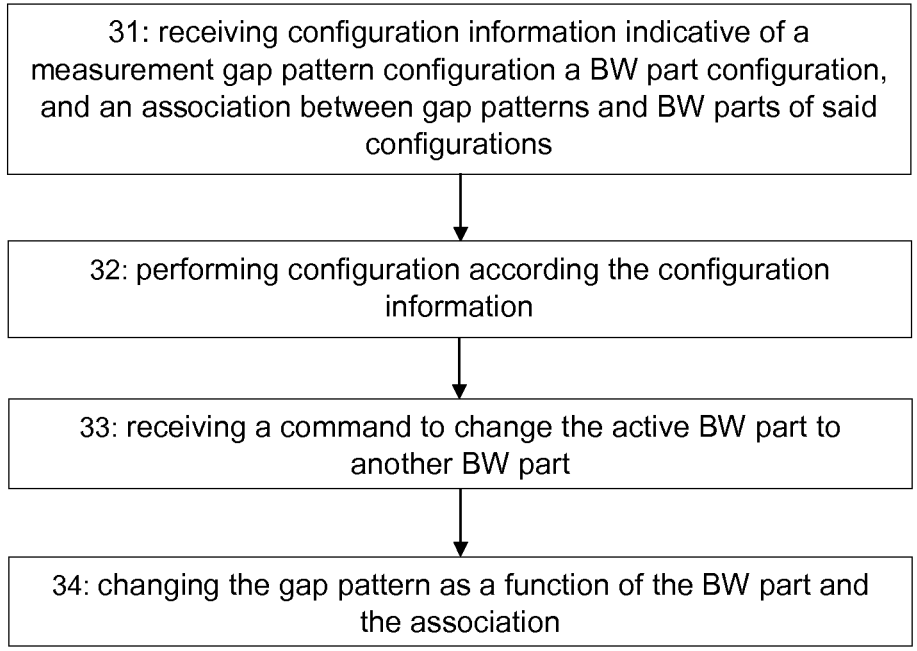
FIG. 3 is a flow chart showing an exemplary method at a UE of measurement gap pattern configuration and BW part configuration according to an embodiment of the present disclosure.

FIG. 3 is a flow chart showing an exemplary method at a UE (for example, UE 10 of FIG. 2) of configuring measurement gap patterns according to an embodiment of the present disclosure.

In step 31, similar to step 21 of FIG. 2, the UE may receive, from a network element (for example, gNB 20 of FIG. 2), one or a plurality of messages (e.g. an RRC message) comprising a measurement gap pattern configuration, a BW part configuration and an association between gap patterns and BW parts. Such information may be transmitted simultaneously or one after the other, in any sequence.

in step 32, similar to step 22 of FIG. 2, the UE performs a configuration according to the configuration messages received from the network.

In step 33, similar to step 23 of FIG. 2, the UE receives a command, e.g. a DCI message, to change the BW part to one of the configured BW parts.

In step 34, the UE changes the BW part according to the received command (DCI-message). The UE 20 further changes the gap pattern as a function of the BW part and the association without any further signaling.

Figure 4:
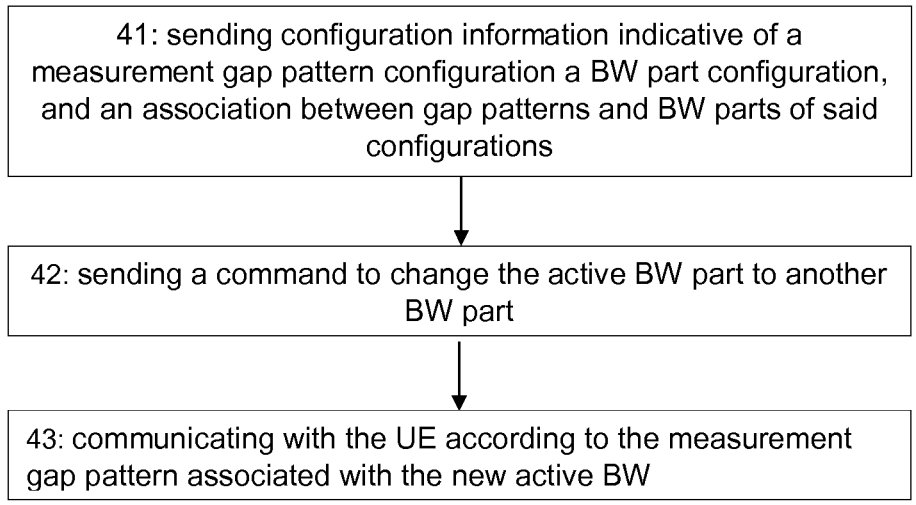
FIG. 4 is a flow chart showing an exemplary method at a network element of measurement gap pattern configuration and BW part configuration according to an embodiment of the present disclosure.

FIG. 4 is a flow chart showing an exemplary method at a network element (for example, the gNB 20 of FIG. 2) of configuring measurement gap patterns for a user equipment (UE) (for example, the UE 10 of FIG. 3) according to an embodiment of the present disclosure.

In step 41, similar to step 21 of FIG. 2, the network element (for example, gNB 20 of FIG. 2) transmits to the UE 10 one or a plurality of messages (e.g. RRC message) comprising a measurement gap pattern configuration, a BW part configuration and an association between gap patterns and BW parts. Such information may be transmitted simultaneously or one after the other, in any sequence.

In step 42, similar to step 23 of FIG. 2, the network (gNB) 20 UE transmits a command, e.g. a DCI message, to the UE 10 to change the active BW part to one of the configured BW parts.

In step 43, the network changes communication with the UE according to the gap pattern associated with the new active BW part in the UE.

Please note that only some specific embodiments of the present disclosure are presented herein, and the present disclosure is not limited thereto.

Figure 5:
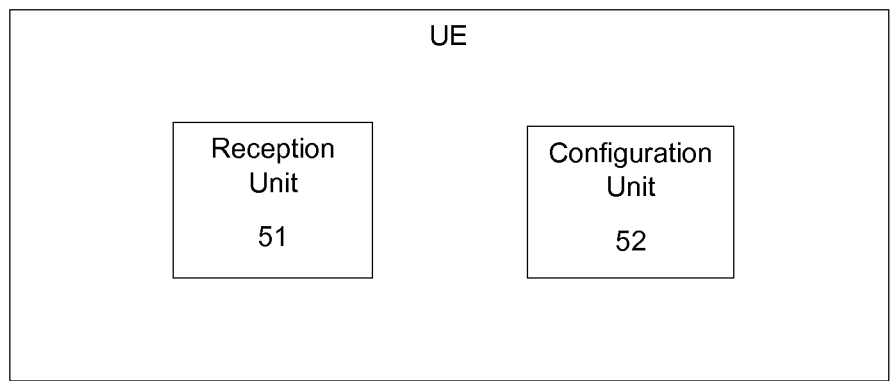
FIG. 5 is a block diagram schematically showing an exemplary network element according to an embodiment of the present disclosure.

FIG. 5 is a block diagram schematically showing an exemplary UE 10 according to an embodiment of the present disclosure. As shown in FIG. 5, the UE 10 may comprise a reception unit 51, and a configuration/processor unit 52. In some embodiments, the reception unit 51 may be configured: to receive, from a network element (for example, gNB 20 of FIG. 2), one or a plurality of messages (e.g. an RRC message) comprising a measurement gap pattern configuration, a BW part configuration and an association between gap patterns and BW parts, and to receive a command, e.g. a DCI message, to changing the active BW part to one of the configured BW parts. The configuration unit 52 may be configured to perform a configuration according to the configuration messages received from the network, to change the active BW part according to the received command (DCI-message).

Each of these units may be a central processing unit (CPU), a digital signal processor (DSP), a micro-processor, a micro-controller, etc., and they can cooperate with other modules/units/portions of the UE 10 to achieve their respective intended functions. Further, the network elements may have other units/modules/parts in forms of hardware/software/firmware, such as, antenna, operating system. Furthermore, the above units may be configured to perform operations other than or in addition to the above-mentioned operations.

Figure 6:
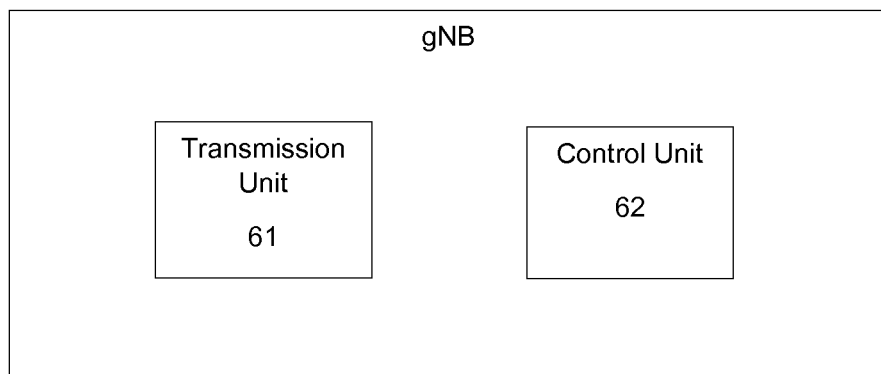
FIG. 6 is a block diagram schematically showing an exemplary UE according to an embodiment of the present disclosure.

FIG. 6 is a block diagram schematically showing an exemplary network node (gNB) 20 according to an embodiment of the present disclosure. As shown in FIG. 6, the gNB 20 may comprise a transmission unit 61 and a control/processor unit 62. In some embodiments, the transmission unit 61 may be configured to transmit to the UE 10 one or a plurality of messages (e.g. RRC message) comprising a measurement gap pattern configuration, a BW part configuration and an association between gap patterns and BW parts, and to transmit to the UE 10 a command, e.g. a DCI message, to change the active BW part to one of the configured BW parts. The control unit 62 may be configured to perform communication with the UE 10 according to the gap pattern associated with the new active BW part in the UE.

Each of these units may be a central processing unit (CPU), a digital signal processor (DSP), a micro-processor, a micro-controller, etc., and they can cooperate with other modules/units/portions of the network element 1300 to achieve their respective intended functions. Further, the UE 1400 may have other units/modules/parts in forms of hardware/software/firmware, such as, antenna, speaker, touch screen, operating system. Furthermore, the above units may be configured to perform operations other than or in addition to the above-mentioned operations.

Figure 7:
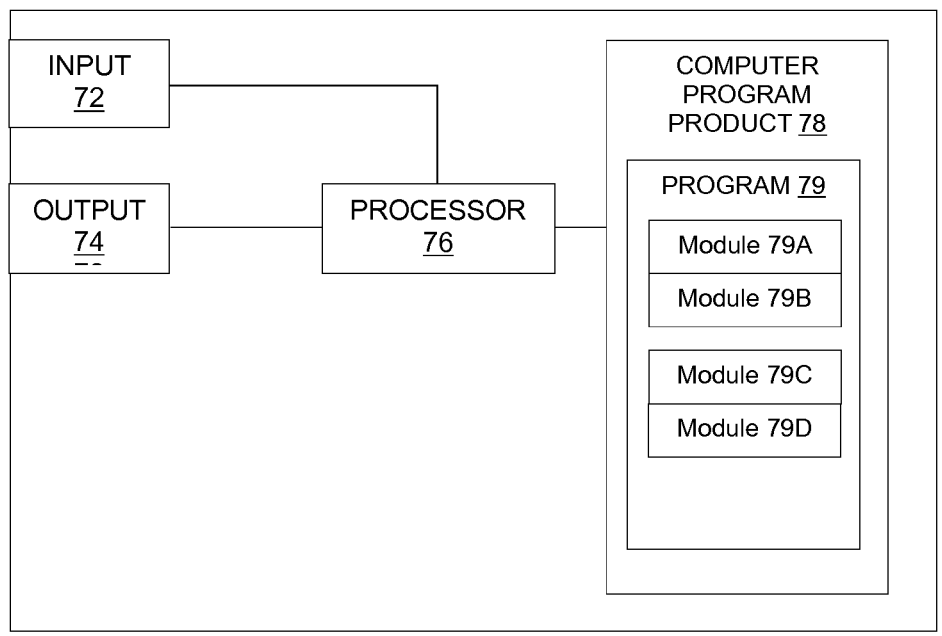
FIG. 7 is a block diagram schematically showing an exemplary arrangement which may be used in a network element and/or a UE according to an embodiment of the present disclosure.

FIG. 7 schematically shows an embodiment of an arrangement 70 which may be used in a network node 20 and/or a UE 10 according to an embodiment of the present disclosure.

Comprised in the arrangement 70 are a processing unit 76, e.g., with a Digital Signal Processor (DSP) or a Central Processing Unit (CPU). The processing unit 76 may be a single unit or a plurality of units to perform different actions of procedures described herein. The arrangement 70 may also comprise an input unit 72 for receiving signals from other entities, and an output unit 74 for providing signal(s) to other entities. The input unit 72 and the output unit 74 may be arranged as an integrated entity or as separate entities.

Furthermore, the arrangement 70 may comprise at least one computer program product 78 in the form of a non-volatile or volatile memory, e.g., an Electrically Erasable Programmable Read-Only Memory (EEPROM), a flash memory and/or a hard drive. The computer program product 78 comprises a computer program 79, which comprises code/computer readable instructions, which when executed by the processing unit 76 in the arrangement 70 causes the arrangement 70 and/or the network element and/or the UE in which it is comprised to perform the actions, e.g., of the procedure described earlier.

The computer program 79 may be configured as a computer program code structured in a plurality of computer program modules 79A-79D. Hence, in an exemplifying embodiment when the arrangement 70 is used in the network element, the code in the computer program of the arrangement 70 includes:

a transmission module 79A to control transmission of one or a plurality of messages (e.g. an RRC message) indicative of a measurement gap pattern configuration, a BW part configuration and an association between gap patterns and BW parts, and to send a command, e.g. a DCI message, to command a changing of the active BW part to one of the configured BW parts in the UE; and a control module 79B to perform communication with the UE 10 according to the gap pattern associated with the new active BW part in the UE.

Further, the computer program 79 may be configured as a computer program code structured in computer program modules 70C-70D. Hence, in an exemplifying embodiment when the arrangement 70 is used in the UE 10, the code in the computer program of the arrangement 70 includes:

a receiving module 79C to control receiving, from a network element, one or a plurality of messages (e.g. an RRC message) comprising a measurement gap pattern configuration, a BW part configuration and an association between gap patterns and BW parts, and to receive a command, e.g. a DCI message, to changing the active BW part to one of the configured BW parts; and a configuration module 79D to perform a configuration according to the configuration messages received from the network, to change the active BW part according to the received command (DCI-message).

The computer program modules could essentially perform the actions of the flow illustrated in the figures, to emulate the network element or the UE. In other words, when the different computer program modules are executed in the processing unit 76, they may correspond to different modules in the network element or the UE.

Although the code means in the embodiments disclosed above in conjunction with FIG. 7 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but may also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Further proposed solutions include a method in a UE of including in measurement report information about the active measurement configuration (i.e. associated to the active BWP) where the measurements were performed by the UE and/or the active measurement configuration based on which the measurement reports were triggered at the UE. The proposed solutions may also include a method at the network node side to associate different measurement configurations with the different BWPs e.g. defining different measurement identifiers for different measurement configurations for the different BWPs.

According to further embodiments, a method is disclosed in a UE of adaptively applying one or more measurement gaps for performing measurements on signals based on a rate of switching of the active BWP e.g. the UE starts measuring without gaps in new active BWP only after the UE has remained in the new active BWP over certain duration (e.g. 100 ms). This makes measurements more stable and avoid ping pong affect (e.g. jumping between measurements with and without gaps).

One measurement configuration in the context of the proposed solutions may be one of the following or a combination of these:
- A complete measConfig (measurement configuration) message that is fully applied when a switching occurs; In that case the UE is provided with a one or a plurality of measConfig messages and a mapping between measConfig messages and configured BWPs, e.g., via a BWP ID and a measConfig ID. Then, when a given BWP is activated the UE activates the mapped measConfig.
- A single measConfig message with one or multiple parameters/IEs/sub-configurations mapping to specific BWP and those sub-configurations/IEs/parameters becomes activated when the BWP switching occurs.

Examples of measurement configurations may include at least one of:
- Measurement gap pattern configurations (e.g., gap offset, length and periodicity);
- Measurement cycle configuration (e.g., cycle offset, periodicity, and measurement duration during the cycle, e.g. 6 ms);
- SMTC window configuration (e.g., offset, length, and periodicity);
- Measurement object list configuration(s), i.e., removal, updating, including;
- Reporting configuration list configuration i.e., removal, updating, including;
- Quantity configuration list;
- s-Measure (RS type can be changed with BWP switching); and DRX.

In an embodiment, only certain parameters in the measurement configuration have a dependency on UE's active BWP. Examples of certain parameter values that may have dependency on UEs active BWP in the measurement configuration may include at least one of:
- Reference signal, SSB or CSI-RS, from which serving cell beam or cell quality is derived;
- Serving cell quality derivation configuration;
- Filtering related to serving cell or beam quality;
- RS type in ReportConfig might change per active BWP; and
- Reference value/RS for an event.

Additional Embodiments

A BWP (BW Part) may be a BWP in download, DL, (DL BWP), in upload, UL, (UL BWP) or both (DL/UL BWP, e.g., in unpaired spectrum where DL and UL BWPs have the same center frequency even though they may or may not have the same bandwidth). Hence, there may be a separate list for DL BWPs and UL BWPs, e.g., for paired spectrum or FDD where the DL BWP and UL BWP may be configured independently. Or there may be a common list for DL/UL BWP, e.g., for unpaired spectrum or TDD where both DL and UL BWPs may be configured jointly.

A UE may be configured with one or more BWPs. A configured DL (or UL) BWP may overlap in frequency domain with another configured DL (or UL) BWP in a serving cell. There may be a maximum limit (e.g., at most 4 DL BWPs and 4 UL BWPs or 4 DL/UL BWPs) on the number of configured BWPs. A BWP configuration comprises at least configuration of frequency resources associated with the BWP, e.g., indicating where in frequency the BWP starts and ends and what bandwidth it has. It may also comprise a BWP identity.

Further, in some examples, a configured BWP may be activated or deactivated, hence the set of activated BWPs may be smaller than the set of configured BWPs. There may be a maximum limit on the number of activated BWPs (e.g., 1, 2, etc.), which may be smaller than the maximum number of configured BWPs and which may depend on UE capability.

There may be also a default BWP, which may be comprised in the list or may be configured separately. It may be configured by the network or may be determined or selected based on one or more pre-defined rules, e.g., the first one in the list, the one indicated explicitly as a default, the one with the largest BW, the one with lower center frequency, the one in which the UE is receiving a specific message, signal or channel, or the one which was activated first when its associated cell was activated, etc. The UE may switch from or to a default BWP, e.g., upon a trigger, timer, counter, or a condition (e.g., when no scheduling information or DCI is received for another BWP the UE may switch to the default BWP).

The binding mechanism is used to associate one or more first BWPs (which may be DL, UL or DL/UL) with one or more first measurement configurations. In one example, the binding is based on one or more of:
- a relation between the BWP frequency resources and/or bandwidth and the frequency resources and/or bandwidth in the measurement configuration(s) and/or signal transmission configuration comprised in the measurement configuration (e.g., frequency resources configured for measurements are comprised within the bandwidth of the BWP; at least X units (e.g., resource blocks) of DL radio signals to be used for measurements are comprised within the bandwidth of the BWP, etc.),
- UE capability (e.g., UE bandwidth capability, UE measurement capability, UE ability to support in parallel a certain amount of measurements for all and/or each of the configured or activated BWPs when the UE requires different amount of resources such as memory, processing, etc.),
- a relation between at least one parameter in the first measurement configuration(s) associated with the first BWP(s) being activated and at least one parameter in a second measurement configuration(s) associated with second BWP(s) which are active (examples of the parameter: periodicity, time offset and/or time-domain pattern of signals/channels of a certain type such as those comprised in SS blocks, CSI measurements configuration, etc.—in one example the first and the second measurements occasions have to be aligned or have some minimum amount of overlap in time when the UE is capable of performing the first and the second measurements at the same time, in another example the first and the second measurement occasions are misaligned or separated in time by at least Delta time when the UE is not capable of performing the first and the second measurements at the same time), a relation between at least one parameter in the first measurement configuration(s) associated with the first BWP(s) being activated and measurement gaps or measurement cycles configured for the UE (e.g., the first measurements should be possible to measure with the already configured measurement gaps or cycles), a relation between at least one parameter in the first measurement configuration(s) associated with the first BWP(s) being activated and DRX configured for the UE (e.g., the first measurements should be possible to measure with the already configured DRX), and a relation between SS block configuration in the first measurement configuration(s) associated with the first BWP(s) being activated and SMTC window configuration (e.g., the SS block based measurements according to the first BWP shall be within the configured SMTC window for the carrier).

In the following further eight embodiments are being described:

In a first embodiment, the binding mechanism between BWP configuration and measurement configuration comprises defining within each provided BWP configuration, which could be part of the serving cell configuration, a measurement configuration message. For example, there can be a measConfig IE within the BWPConfig IE, where for each serving cell configuration there can be a list of BWPConfig(s), as shown below. That is different from LTE and current NR agreements, where only a single measConfig is provided to the UE and, the one provided is considered by the UE the one to be activated.

BWPConfigList Information Element

```
-- ASN1START
BWPConfigList::=     SEQUENCE (SIZE (1..maxBWPConfig)) OF BWPConfig
BWPConfig ::= SEQUENCE {
--Other IEs omitted (e.g. control/data channel configuration, etc.)
    measConfig       MeasConfigNR           OPTIONAL,
}
-- ASN1STOP
```

In a second embodiment, the binding mechanism between BWP configuration and measurement configuration comprises defining a list of measurement configuration(s) and associate each of them with a measConfigId. Then, within each provided BWP configuration, which could be part of the serving cell configuration, include the measurement configuration identifier. That would enable an efficient signalling reuse of some measConfig code where simply the identifier could be repeated for different BWP configurations.

In a third embodiment, some of the parameters currently defined for measConfig, e.g., measurement gap configuration, are moved from the measConfig IE and instead become part of BWPConfig IE. Then, the switching of BWP (or activation/deactivation) triggers the UE to start or stop using a given measurement gap configuration. Notice that this can be valid for any parameter in the measConfig IE such as the list of measurement objects, report configuration, s-Measure configuration (RS type and threshold value).

In a fourth embodiment, some of the parameters currently defined for measConfig, e.g., measurement gap configuration, are not only defined in the measConfig IE but can in addition become part of BWPConfig IE. These can be optional in both IEs and, depending how network wants to configure them it can configure in the measConfig, valid for all BWPs, or in each BWPConfig IE. In that embodiment, the BWPConfig take precedent in the case the same parameter is configured in an activated BWP and in measConfig. In general, a default, or base configuration may be provided, relative to which delta-configurations are provided for each BWP (i.e. only parts of the configuration for a BWP that deviates from the base/default configuration are indicated in the configuration for a specific BWP). Alternatively, the measConfig IE may be divided into a common part and BWP specific parts, where the parameters in the common part are applied to all BWPs, while the other parameters are configured for each BWP separately in the BWP specific parts. As yet another alternative, such a division into a common part and BWP specific parts may instead, or in addition, be performed on a "lower hierarchical IE level", e.g. in the measObjectNR IE and/or the reportConfigNR IE.

In a fifth embodiment, each BWP config has its own ID, and in each measurement configuration, BWP ID list is included in it. Then UE can know which BWP the measurement configuration applies to. The ASN.1 looks as below:

```
MeasObjectNR ::=                   SEQUENCE {
    carrierFreq                    ARFCN-ValueNR,
    --RS configuration (e.g. SMTC window, CSI-RS resource, etc.)
    referenceSignalConfig          ReferenceSignalConfig
                    OPTIONAL,
    ...
    -- BWP list to apply this measurement object
    bwpList         BWPList              OPTIONAL,
}
BWPList ::= SEQUENCE (SIZE (1..maxBWPId)) OF BWPId
```

In a sixth embodiment, UE has been configured in serving cell configuration on different BWPs that may be activated and which have an ID similar to above. When certain parameters within one measurement configuration depend on UE's active BWP, the BWP ID which is relevant to a given parameter is given in the measurement configuration linked with the parameter. It given as a list pairs {parameter_value, BWP_ID} instead of one parameter value.

In a seventh embodiment, the UE is configured with a set of different measurement configurations without a predetermined binding to a specific BWP. Instead, the gNB indicates which measurement configuration the UE should apply in the DCI which instructs the UE to switch to a new BWP. The indication in the DCI may be an identifier associated with each measurement configuration. The set of different measurement configurations may be encoded separately or using a compression scheme, e.g. using common and specific parts or using a default/base configuration relative which delta-configurations are listed.

In an eighth embodiment, the UE obtains at least one timing related parameter, which is used by the UE to determine whether the UE can perform one or more measurements on signals (e.g. SSB, CSI-RS) within an active BWP with or without measurement gaps or when the UE can start doing measurements without gaps. Therefore, the timing related parameter(s) are used by the UE as one of the criteria for deciding whether the UE should perform measurements using measurement gaps or not upon switching to the new active BWP. Examples of the timing parameter are the duration threshold (Td), rate (Tr) at which active BWP is changed or switched. Examples of duration threshold (Td) are 100 ms, duration equal to measurement period of the measurement, duration equal to the measurement gap length (MGL), duration equal to the measurement gap repetition period (MGRP) etc. Examples of the parameter, Tr, are one active BWP switch every 100 ms, K1 number of switches of the active BWP within K2 duration etc. The UE obtains the timing parameter (e.g. Td and/or Tr) based on one or more of the following mechanisms: based on pre-defined value (e.g. pre-defined in the standard), based on information received from the network node (e.g. as part of the measurement configuration sent to the UE by the network node). The use of the timing parameter for deciding whether to apply the gaps or not or when to start performing measurement without gaps (gapless pattern) is explained with the following example:

Assume that the UE is configured by the network node with duration threshold of e.g. 100 ms (i.e. Td=100 ms). The active BWP of the UE is switched or changed (e.g. via DCI signaling) from the old active BWP (BWP1) of the UE to a new active BWP (BWP2) of the UE. In this case, the UE is required to use the measurement configuration (e.g. CONF2) associated with the BWP2. According to this embodiment, the UE decides whether to perform measurements using CONF2 with or without measurement gaps by taking into account the value of the parameter Td. According to one example of the rule the UE does not perform measurement without gaps immediately after switching to BWP2 even though the signals on which the measurements are to be performed by the UE are within the BW of BWP2. Instead the UE continue using the measurement gaps until the BWP2 remains the active BWP of the UE continuously over the duration of Td, where Td starts from the instance the UE has switched to BWP2. This means the UE will start measurement without gaps after the expiration of Td. This rule prevents the UE from switching too often between gap based and gap less measurements and therefore makes the measurements stable and consistent. For example, without this rule if the BWP2 of the UE remains the active BWP over much shorter duration (e.g. over 5 ms) or if it frequently switches (e.g. once every 10 ms) between BWP1 and BWP2 then the UE will have to obtain measurement samples in gaps and also without gaps. This may increase UE complexity and may also result in an inconsistency in the overall measurement performance, e.g. the measurement period will not be well defined.

Figure 8:
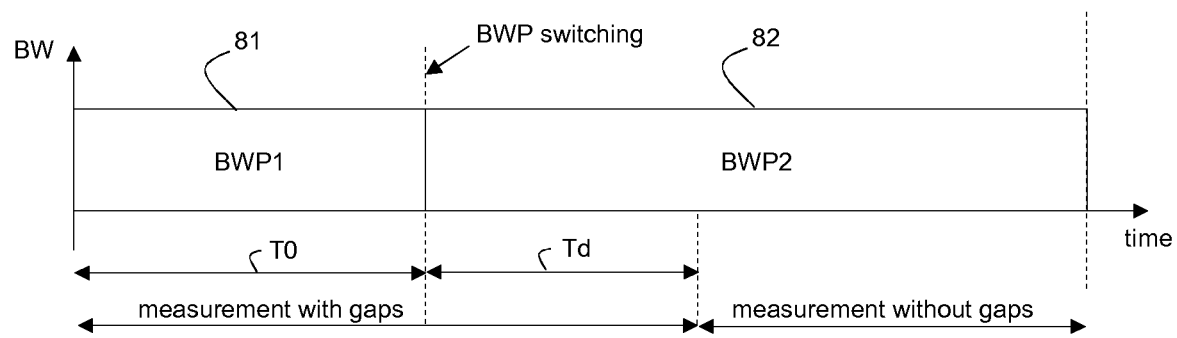
FIG. 8 illustrates an adaptive use of gaps for measurements after switching between active BW parts.

FIG. 8 illustrates above-described example, wherein during a first time period T0, the active BWP is a first BWP 81. It is switched to a second BWP 81 after the first time period T0. The UE is required to measure with gaps over at least a second time period Td even after switching to the second BWP 82. After the second time period Td, the UE can change to measure without gaps.

In the following embodiments, exemplary UE actions upon changing the BWP are proposed.

Upon triggering the activation of a BWP e.g. based on DCI or based on a configured timer (hereafter also including activating a default BWP), the UE shall start using the measConfig associated (e.g., based on the binding mechanism described above) to the BWPConfig associated to the newly activated BWP. The UE shall override the previously activated measurement configuration, as any delta RRC signalling. The UE can delete the previously activated measConfig associated to the previously active BWP.

If upon triggering the activation of a BWP based on DCI or based on a configured timer, the UE has serving cell(s) and neighbor cell(s) measurements available AND the newly activated BWP has the same measConfig as the previous activated BWP (e.g. identified by the same measConfigId or the same parameter settings, etc.) the UE keeps previously performed measurements, event evaluation and any other actions (e.g., on processing, using and reporting) related to the previously received measurement configuration.

If upon triggering the activation of a BWP based on DCI or based on a configured timer, the UE has serving cell(s) and neighbor cell(s) measurements available AND the newly activated BWP has a different measConfig compared to that of the previous activated BWP (e.g. identified by a different measConfigId or the different parameter settings, etc.) the UE deletes previously performed measurements, event evaluation and any other actions related to the previously received measurement configuration. In another embodiment, even if the measConfig is different, the UE can use previously performed measurements associated to a measObject that is present both in the old and new measConfig if measurement related parameters, such as the ones on cell quality derivation (e.g. threshold for good beams and maximum number of beams to be averaged) are the same. These previously performed measurements can be used for measurement events evaluation of the new measConfig associated to the newly activated BWP.

If upon triggering the activation of a BWP based on DCI or based on a configured timer, the UE had a triggering event (e.g. event entering condition) the UE can send a measurement report associated with a previous measConfig, including means to enable the network to identify that such a report is associated with a previous measConfig (i.e. a measConfig obtained when another BWP was activated). For that purpose, in one solution the UE can include a measConfig ID and/or a BWP ID associated to the active BWP associated to the provided measConfig. In another solution, the network simply allocates different measurement identifiers for the different measurement configurations so that a given measId included in each measurement report tells the network which measConfig that should be associated to.

If upon triggering the activation of a BWP based on DCI or based on a configure timer, the UE has serving cell(s) and neighbor cell(s) measurements available AND the newly activated BWP has a different measConfig as the previous activated BWP (e.g. identified by a different measConfigId or the different parameter settings, etc.), the UE does not delete previously performed measurements and, upon the triggering of a measurement report event associated to the new measurement configuration (associated to the new active BWP), the UE includes the measurements performed associated with the previous measurement configuration. In one solution, only serving cell measurements are included. In another solution, only neighbor cell measurements are included. In another solution, both serving cell and neighbor cell measurements are included.

In an embodiment, when BWP is switched by DCI or based on a configured timer, for cell measurement report, UE keep the measurement samples which it obtained in a previous BWP and combine them together with the newly measured samples in new BWP to trigger/generate cell measurement report.

In an embodiment, when BWP is switched by DCI or based on a configured timer, if UE is required to send BWP specific measurement report, UE delete those measurement samples which it obtained in a previous BWP, and trigger/generate BWP specific measurement report using the new measurement sample in the new BWP.

In an embodiment, a measurement report may also be sent, even if measConfig is different for the new BWP compared to the one from which the UE is switching, if the measurement is of a certain type or for a certain purpose (e.g., always report measurements of the first type but not of the second type). In yet another embodiment, the network may explicitly indicate to the UE whether the measurement shall still be reported if the BWP changes.

In an embodiment, the UE may be required to complete the already configured measurements based on the measurement configuration associated with a BWP prior to deactivating the BWP or switching to another BWP; hence the UE may be allowed to delay the deactivation of the BWP or switching to another BWP to accommodate the time necessary to complete or in some embodiments also to report the measurement prior to deactivating the BWP or switching to another BWP.

In an embodiment, the UE can perform logging of the measurements if not able to report them due to deactivating the BWP or switching to another BWP. Such measurements can be stored for up to a certain time and may also be reported at a later occasion or upon the network request.

In an embodiment, it is determined whether the UE may or may not continue the started but not yet completed measurements based on the old measurement configuration. In one example, whether the UE can continue measurements based on the measurement configuration associated with a first BWP after switching to a second BWP, may depend on the amount of overlap (in frequency) between the first and the second BWPs, e.g., the UE shall continue if the overlap is not less than a threshold (e.g., X % or Y RBs), otherwise the UE shall restart the measurements. In one example, X=100% may mean that the newly activated BWP comprises the previous BWP (e.g., the bandwidth of the first BWP is within the bandwidth of the second BWP which may be the same or larger than the bandwidth of the first BWP) from which the switching occurs.

If the UE shall continue the old measurements, then the UE may be required to meet the same requirements (e.g., measurement requirements, measurement accuracy requirements, UE performance requirements) before BWP switching, during BWP switching, and also after the BWP switching, provided the measurement occasions or the measured signal availability do not change. Otherwise (if the measurement occasions or the measured signal availability changes), during the BWP switching and until the measurement is complete and/or reported the UE shall meet the most relaxed requirement (e.g., longest time and/or worst accuracy) between the one before BWP switching and after BWP switching. The measurement occasions or the measured signal availability may be determined, e.g., by signal transmissions (not available if not transmitted), by measurement gaps (a configured measurement occasion in a serving cell may still not be available at the UE receiver if the UE creates a measurement gap for performing a measurement or receiving a channel on another frequency).

In another example, the UE shall stop the old measurements if the overlap is below a threshold or zero.

In an embodiment, the UE handles the measurement samples obtained prior and after the BWP switch (i.e. measurement samples obtained in the old and new BWPs respectively) differently depending on the results of the measurements. As one example, the UE may first derive one cell quality value based on the measurement samples obtained in the first BWP and another cell quality value based on the measurement samples obtained in the second BWP, e.g. based on averaging of measurement samples. If the two cell quality values differ more than a predetermined threshold value, the UE is configured to report the two cell quality values separately, indicating which BWP each of the cell quality values pertains to. The configuration could optionally also include that the UE should report how many measurement samples that was used for deriving the respective cell quality values. If, on the other hand, the two derived cell quality values differ less than the predetermined threshold value, than the UE combines the two cell quality values into a single cell quality value, e.g. by averaging the two cell quality values weighted by the number of measurement samples used for each cell quality value, or by "restarting" the calculation of the cell quality value using all measurement samples (from both BWPs) in accordance with regular cell quality derivation calculation.

As an alternative to a predetermined threshold value for the difference between the two cell quality values obtained in the first and the second BWP, a relative threshold value may be used to control the above described selective behavior. For instance, if the ratio between the greatest and the smallest of the two derived cell quality values is larger than a predetermined threshold value, the UE acts in accordance with what is describe above for the case when the difference between the two cell quality values exceeds a predetermined threshold value.

The predetermined threshold value may be standardized or configured by the gNB, e.g. in the reportConfigNR IE or the measObjectNR IE or the measConfig IE, e.g. included in a RRCConnectionReconfiguration message, or the predetermined threshold value may be configured via system information.

As a variation of the above described embodiment with selective treatment of cell quality values derived from different BWPs, the measurement may be extended with additional samples in the second BWP, so that a full number of samples is obtained from the second BWP (i.e. the number of samples that are usually used for cell quality derivation).

If the UE is configured to report beam level measurement results, the UE may for each beam indicate in the report which BWP, or BWPs, its associated measurement result was obtained from. The UE may also report per beam how many samples that was obtained from the first and the second BWP respectively. Optionally, the UE may be configured to conditionally report beam level measurement results only if the measurement samples are obtained from more than one BWP.

In the embodiments previously described herein, more than two BWPs may be involved, i.e. measurement samples may be obtained from more than two BWPs, e.g. if the UE switches from a first to a second to a third BWP while the measurement is ongoing (i.e. the gathering of measurement samples spans two or more BWP switches. The embodiments where the UE handles the measurement samples obtained in different BWPs separately or differently/selectively may be extended, e.g. so that cell quality values may be derived from measurement samples from each involved BWP separately (i.e. one cell quality value per BWP which may or may not be combined into a single cell quality value).

In the previously described embodiments where a single cell quality value is reported based on measurement samples obtained in more than one BWP, the UE may include an indication in the measurement report, indicating that derived cell quality is based on measurement samples obtained in more than one BWP. The indication can be simple, merely indicating that more than one BWP was involved, or more elaborate, indicating the exact number of involved BWP(s) and/or even the number of measurement samples obtained from each involved BWP.

In an embodiment, the network indicates in the BWP switch indication (e.g. via DCI) which of a number of predetermined (e.g. preconfigured) ways to handle measurement samples obtained in different BWPs (e.g. indicates one of the above UE behavior related embodiments) the UE should apply in conjunction with this BWP switch. The different possible ways to handle the measurement/measurement samples that may be indicated may be standardized, configured via RRC, e.g. using the RRCConnectionReconfiguration message or configured via the system information.

In an embodiment, the network/gNB indicates in the BWP configuration, which of a number of predetermined (e.g. preconfigured) ways to handle measurement samples obtained in different BWPs (e.g. indicates one of the above UE behavior related embodiments) the UE should apply when the UE is switching from this BWP to another BWP or, alternatively, when the UE is switching from another BWP to this BWP.

Above-described measurements may be on cell level and/or on beam level. These can be based on one or more of: SS Block, synchronization signals, reference signals (e.g., CSI-RS, DMRS, reference signals for positioning, PTRS, TRS).

In an embodiment, the UE stores the information about all or some (e.g., N last) configured and/or activated BWPs. Such BWP history information may be maintained up to a certain number of time units.

The UE can also store corresponding BWP configurations and/or corresponding (based on binding) measurement configuration. The UE can also store cell information (e.g., cell ID) associated with the BWPs.

The UE may add a new record in such history information every time a new BWP is configured and/or activated, depending on what the UE needs to store. The UE may also remove the information related to some BWPs, e.g., when the BWPs were configured long time ago or when the number of newer BWPs exceeds N.

The BWP history information may also be sent to a network node upon a request or in unsolicited way, or upon a trigger. The network node receiving the BWP history information may further use it for one or more of its operational tasks, e.g., configuring one or more parameters to control measurement triggering, measurement reporting, handover, SON, O&M, etc.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method in a user equipment, UE, for a measurement gap pattern configuration comprising:
receiving configuration information indicative of a plurality of measurement gap pattern configurations and a plurality of bandwidth (BW) part configurations;
determining an association between each measurement gap pattern configuration of the plurality of measurement gap pattern configurations and a corresponding BW part configuration of the plurality of BW part configurations;
receiving a message to change an active BW part configuration to another BW part configuration;
changing the measurement gap pattern configuration as a function of the corresponding BW part configuration and the association;
delaying changing or switching to the other BW part configuration to accommodate a time to complete and report a gap measurement; and
continuing a measurement gap pattern with gaps associated with the active BW part configuration for a threshold time period (Td) after changing or switching to the other BW part configuration in response to the other BW part configuration including a corresponding measurement gap pattern without gaps.

2. The method of claim 1, further comprising:
performing the gap measurement in a neighbor cell according to a gap pattern associated to the active BW part configuration.

3. The method of claim 1, wherein the configuration information is received from a network node.

4. The method of claim 1, wherein the configuration information is comprised in one or a plurality of Radio Resource Control, RRC, messages.

5. The method of claim 1, wherein the message to change the active BW part is received from a network node.

6. The method of claim 1, wherein the message is a layer 1 message or a DCI message.

7. The method of claim 1, wherein the measurement gap pattern configurations are characterized by at least one of: a periodicity, a gap length and a gap offset.

8. The method of claim 1, wherein the measurement gap pattern configurations comprise at least one measurement gap pattern with gaps of zero length, implying that a neighbor measurement cell is measured without measurement gaps.

9. The method of claim 1, further comprising determining the threshold time (Td) to be applied for switching the measurement from the measurement gap pattern with gaps to the corresponding measurement gap pattern without gaps after switching the active BW part configuration to the other BW part configuration.

10. The method of claim 9, wherein the threshold time (Td) is determined based on one of:
a pre-defined value;
information received from a network node;
measurement configuration information received from a network node.

11. The method of claim 1, wherein performing the gap measurement comprises switching off a receiver from a current active cell, tuning the receiver to another cell, performing a signal quality measurement, and after the gap measurement retuning the receiver to the current active cell.

12. The method of claim 1, wherein the association between the measurement gap pattern configurations and the BW part configurations is received from a network node.

13. The method of claim 1, wherein the message to change the active BW part configuration to the other BW part configuration is received from a network node.

14. A user equipment, UE, adapted to perform the method of claim 1.

15. A user equipment, UE, comprising:
a processor; and
a memory storing instructions which, when executed by the processor, cause the processor to perform the method of claim 1.

16. A non-transitory computer readable storage medium having instructions stored thereon, which, when executed by a processor, cause the processor to perform the method of claim 1.

17. A method in a network node, gNB, for a gap measurement configuration of a UE, comprising:
transmitting configuration information indicative of a plurality of measurement gap pattern configurations and a plurality of bandwidth part (BW) configurations;
determining an association between each measurement gap pattern configuration of the plurality of measurement gap pattern configurations and a corresponding BW part configuration of the plurality of BW part configurations; and
transmitting a message to change an active BW part configuration to another BW part configuration, wherein the measurement gap pattern configuration is changed by the UE as a function of the corresponding BW part configuration, wherein changing or switching to the other BW part configuration is delayed to accommodate a time to complete and report a gap measurement, and wherein the UE continues using a measurement gap pattern with gaps associated with the active BW part configuration for a threshold time period (Td) after changing or switching to the other BW part configuration in response to the other BW part configuration including a corresponding measurement gap pattern without gaps.

18. The method of claim 17, further comprising
transmitting to the UE information indicative of the association between each measurement gap pattern configuration and the corresponding BW part configuration.

19. The method of claim 17, further comprising sending to the UE the threshold time (Td) to be applied for switching the measurement from the measurement gap pattern with gaps to the corresponding measurement gap pattern without gaps after switching the active BW part configuration to the other BW part configuration.

20. The method of claim 17, wherein the configuration information is comprised in one or a plurality of Radio Resource Control, RRC, messages.

21. The method of claim 17, wherein the message to change the active BW part configuration is a layer 1 message, e.g. a downlink control information, DCI, message.

22. A network node, gNB, adapted to perform the method of claim 18.

23. A network node, gNB, comprising:
a processor; and
a memory storing instructions which, when executed by the processor, cause the processor to perform the method of claim 18.

24. A non-transitory computer readable storage medium having instructions stored thereon, which, when executed by a processor, cause the processor to perform the method of claim 18.

* * * * *